(12) United States Patent
Kusama

(10) Patent No.: US 8,237,999 B2
(45) Date of Patent: Aug. 7, 2012

(54) AUTOMATIC DOCUMENT FEEDER AND IMAGE READING DEVICE

(75) Inventor: Takuro Kusama, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 617 days.

(21) Appl. No.: 12/405,554

(22) Filed: Mar. 17, 2009

(65) Prior Publication Data

US 2009/0237754 A1 Sep. 24, 2009

(30) Foreign Application Priority Data

Mar. 19, 2008 (JP) ................................ 2008-071398

(51) Int. Cl.
*H04N 1/04* (2006.01)

(52) U.S. Cl. ... 358/498; 358/474; 358/497; 271/258.05; 271/186; 399/405; 399/92

(58) Field of Classification Search ................ 358/474, 358/498, 486, 497, 496; 271/258.05, 167, 271/156, 3.14, 225, 3.17, 165, 212, 186, 271/301; 399/405, 92, 400, 374
See application file for complete search history.

(56) References Cited

U.S. PATENT DOCUMENTS

| | | | |
|---|---|---|---|
| 4,910,612 A | 3/1990 | Yamazaki | |
| 5,669,056 A | 9/1997 | Rubscha | |
| 6,009,303 A * | 12/1999 | Kumagai et al. | 399/370 |
| 6,088,135 A * | 7/2000 | Kusumoto | 358/498 |
| 6,529,259 B1 | 3/2003 | Kono | |
| 6,542,163 B2 * | 4/2003 | Gorbet et al. | 715/711 |
| 6,563,611 B1 * | 5/2003 | Kao | 358/498 |
| 7,446,908 B2 * | 11/2008 | Araki et al. | 358/474 |
| 7,468,818 B2 * | 12/2008 | Suzuki | 358/498 |
| 7,481,427 B2 * | 1/2009 | Tokutsu | 271/186 |
| 7,612,925 B2 * | 11/2009 | Tseng | 358/496 |
| 7,616,358 B2 * | 11/2009 | Su et al. | 358/498 |
| 7,654,527 B2 * | 2/2010 | Sheng et al. | 271/270 |
| 7,665,728 B2 * | 2/2010 | Kusama | 271/186 |
| 7,703,764 B2 * | 4/2010 | Kusama | 271/186 |

(Continued)

FOREIGN PATENT DOCUMENTS

JP 08-123103 5/1996

(Continued)

OTHER PUBLICATIONS

Search report received for counterpart EP Application No. 09 00 3534, mailed Dec. 29, 2009.

(Continued)

*Primary Examiner* — Negussie Worku
(74) *Attorney, Agent, or Firm* — Banner & Witcoff, Ltd.

(57) ABSTRACT

There is provided an automatic document feeder, comprising: a document tray; an output tray; a first rotating body that ejects the document to the output tray; a second rotating body that ejects the document to the output tray; a reversing mechanism that reverses a carrying direction of the document which passed the reading portion to carry again the document to the reading portion; a sinking mechanism that sinks the document into a position between a bottom of a document already stacked on the output tray and a surface of the output tray; and a switching mechanism configured to switch between a first motion of carrying the document to the first rotating body and a second motion of carrying the document to the second rotating body, in accordance with whether the reversing mechanism is activated.

12 Claims, 13 Drawing Sheets

U.S. PATENT DOCUMENTS

| | | | |
|---|---|---|---|
| 7,881,652 B2* | 2/2011 | Edwards et al. | 399/364 |
| 7,924,474 B2* | 4/2011 | Itoh | 358/474 |
| 7,931,274 B2* | 4/2011 | Krucinski | 271/264 |
| 7,974,567 B2* | 7/2011 | Park | 399/374 |
| 7,976,008 B2* | 7/2011 | Kusama | 271/3.17 |
| 2005/0024692 A1 | 2/2005 | Shyu | |
| 2006/0227390 A1* | 10/2006 | Mochimaru et al. | 358/498 |
| 2007/0210512 A1 | 9/2007 | Sakakibara et al. | |

FOREIGN PATENT DOCUMENTS

| | | |
|---|---|---|
| JP | 08-282897 | 10/1996 |
| JP | 11-314856 | 11/1999 |
| JP | 2001-058739 | 3/2001 |
| JP | 2001-106408 | 4/2001 |
| JP | 2005-089153 | 4/2005 |
| JP | 2006-232460 | 9/2006 |

OTHER PUBLICATIONS

Japanese Office Action received, Notification of Reasons of Rejection for counterpart JP Application No. 2008-071398, mailed Jan. 26, 2010.

* cited by examiner

AUTOMATIC DOCUMENT FEEDER AND IMAGE READING DEVICE

CROSS-REFERENCE TO RELATED APPLICATION

This application claims priority under 35 U.S.C. §119 from Japanese Patent Application No. 2008-071398, filed on Mar. 19, 2008. The entire subject matter of the application is incorporated herein by reference.

BACKGROUND

1. Technical Field

Aspects of the present invention relate to an automatic document feeder capable of automatically feeding a document into a reading unit of an image reading device, and an image reading device employing such an automatic document feeder.

2. Related Art

In general, in order to read an image (including text) formed on each of front and back sides of a document (hereafter, referred to as double-sided reading), it is necessary to reverse a carrying direction of the document after finishing reading of the front side of the document by a reading unit, and to read the back side of the document being carried in the reversed carrying direction by carrying the document to the image reading unit.

For example, If the document having a plurality of sheets of paper stacked in a vertical direction on a document tray is to be read from a sheet of paper placed at the bottom one-by-one to perform double-sided reading, when the sheets of paper for which reading are finished are simply placed on a output tray in sequence, the sheets of paper for which reading is finished are stacked on the output tray such that the first sheet of paper for which reading is finished first is placed at the bottom on the paper output tray. Therefore, in this case, the page sequence of the sheets of paper placed on the document tray is different from the page sequence of the sheets of paper placed on the output tray.

For example, assuming that two sheets of paper A and B (documents A and B) are placed on the document tray such that the front side of the document A, the back side of the document A, the front side of the document B and the back side of the document B are defined as the first, second, third and fourth pages, respectively, and that the document A is stacked on the document B are stacked while facing the front side of each document upward, the two documents A and B are output to the output tray in a state where the document B is placed on the document A and the front side of each document faces upward.

For this reason, the documents which have been arranged on the document tray in the order of the first, the second, the third and the fourth pages are arranged, on the output tray, in the order of the third, the fourth, the first, and the second pages. Thus, the page sequence of the documents placed on the document tray becomes different from the page sequence of the documents on the output tray.

On the other hand, in order to read an image only from the front side of the document (hereafter, referred to as single-side reading), the automatic document feeder may outputs the document for which the reading is finished to the output tray without reversing the carrying direction of the document. Therefore, the page sequence of the documents on the document tray does not become different from the page sequence of the documents on the output tray.

Japanese Patent Provisional Publication No. HEI 11-314856 (hereafter, referred to as JP HEI 11-314856A) discloses an automatic document feeder configured such that a first output tray dedicated for the single-side reading is located on one side with respect to a reading unit and a second output tray dedicated for the double sided reading is located on the other side with respect to the reading unit so that the page sequence of the document on a document tray does not become different from the page sequence of the document on the output tray when the double-sided reading is performed.

SUMMARY

However, the automatic document feeder disclosed in JP HEI 11-314856A is configured to have a plurality of paper output trays, the user needs to check which of the output trays has received the document, which is not convenient for the user.

Aspects of the present invention are advantageous in that an automatic document feeder capable of performing the double-sided reading and the single-side reading while enhancing usability is provided.

According to an aspect of the invention, there is provided an automatic document feeder, comprising: a document tray on which a document to be read is placed; an output tray on which the document for which image reading is finished is placed; a first rotating body that rotates and contacts the document to eject the document for which the image reading is finished by passing a reading portion, to the output tray; a second rotating body that rotates and contacts the document to eject the document for which the image reading is finished by passing the reading portion, to the output tray; a reversing mechanism that reverses a carrying direction of the document which passed the reading portion to carry again the document to the reading portion; a sinking mechanism that sinks the document ejected from the first rotating body into a position between a bottom of a document already stacked on the output tray and a surface of the output tray; and a switching mechanism configured to switch between a first motion of carrying the document to the first rotating body and a second motion of carrying the document to the second rotating body, in accordance with whether the reversing mechanism is activated.

Such a configuration prevents the page sequence of documents ejected on the output tray from becoming different from the page sequence of documents placed on the document tray.

Considering the case where two sheets of paper (hereafter, referred to as document A and document B) are placed on the document tray, the front-face of the document A is defined as page 1, the back-face of the document A is defined as page 2, the front-face of the document B is defined as page 3, and the back-face of the document B is defined as page 4, and the documents A and B are stacked on the document tray such that each front-face faces upward, in this case by executing the image reading in the double-sided reading mode and carrying each document for which the image reading is finished to the first rotating body, the document B is stacked on the document B on the output tray such that each front-face faces downward.

Therefore, on the output tray, the documents are arranged in order of page 1, page 2, page 3 and page 4 in this order from the bottom to the top. Therefore, the page sequence of the documents placed on the document tray is equal to the page sequence of the documents on the output tray.

On the other hand, regarding the single-side reading, by carrying the document for which the image reading is finished to the first rotating body, the page sequence of the documents placed on the document tray is equal to the page sequence of the documents on the output tray.

Therefore, the automatic document feeder is able to prevent the page sequence of the documents on the output tray from becoming different from the page sequence of documents on the document tray while requiring only a single type of output tray. Such a configuration eliminates the need for checking which of output trays is used for ejecting the documents. Therefore, usability of the automatic document feeder capable of executing both of the single-side reading and the double-sided reading can be enhanced.

According to another aspect of the invention, there is provided an image reading device, comprising: an automatic document feeder; and a reading portion configured to read an image from a document carried by the automatic document feeder. The automatic feeder comprises: a document tray on which a document to be read is placed; an output tray on which the document for which image reading is finished is placed; a first rotating body that rotates and contacts the document to eject the document for which the image reading is finished by passing a reading portion, to the output tray; a second rotating body that rotates and contacts the document to eject the document for which the image reading is finished by passing the reading portion, to the output tray; a reversing mechanism that reverses a carrying direction of the document which passed the reading portion to carry again the document to the reading portion; a sinking mechanism that sinks the document ejected from the first rotating body into a position between a bottom of a document already stacked on the output tray and a surface of the output tray; and a switching mechanism configured to switch between a first motion of carrying the document to the first rotating body and a second motion of carrying the document to the second rotating body, in accordance with whether the reversing mechanism is activated.

Such a configuration prevents the page sequence of documents ejected on the output tray from becoming different from the page sequence of documents placed on the document tray.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

DETAILED DESCRIPTION

Hereafter, embodiments according to the invention will be described with reference to the accompanying drawings.

First Embodiment

Figure 1:
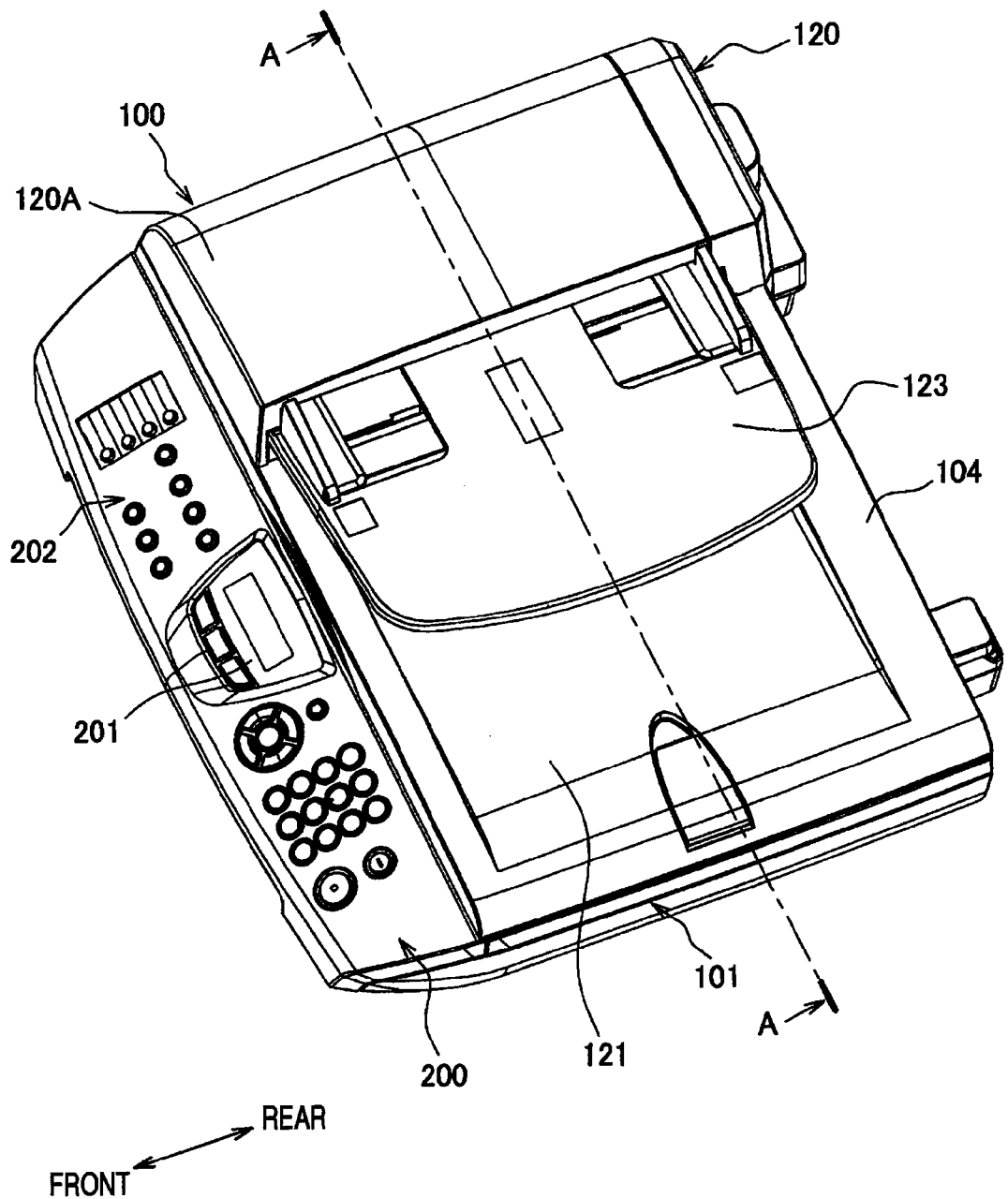
FIG. 1 is a perspective view of an image reading device viewed from the top side thereof.
Figure 2:
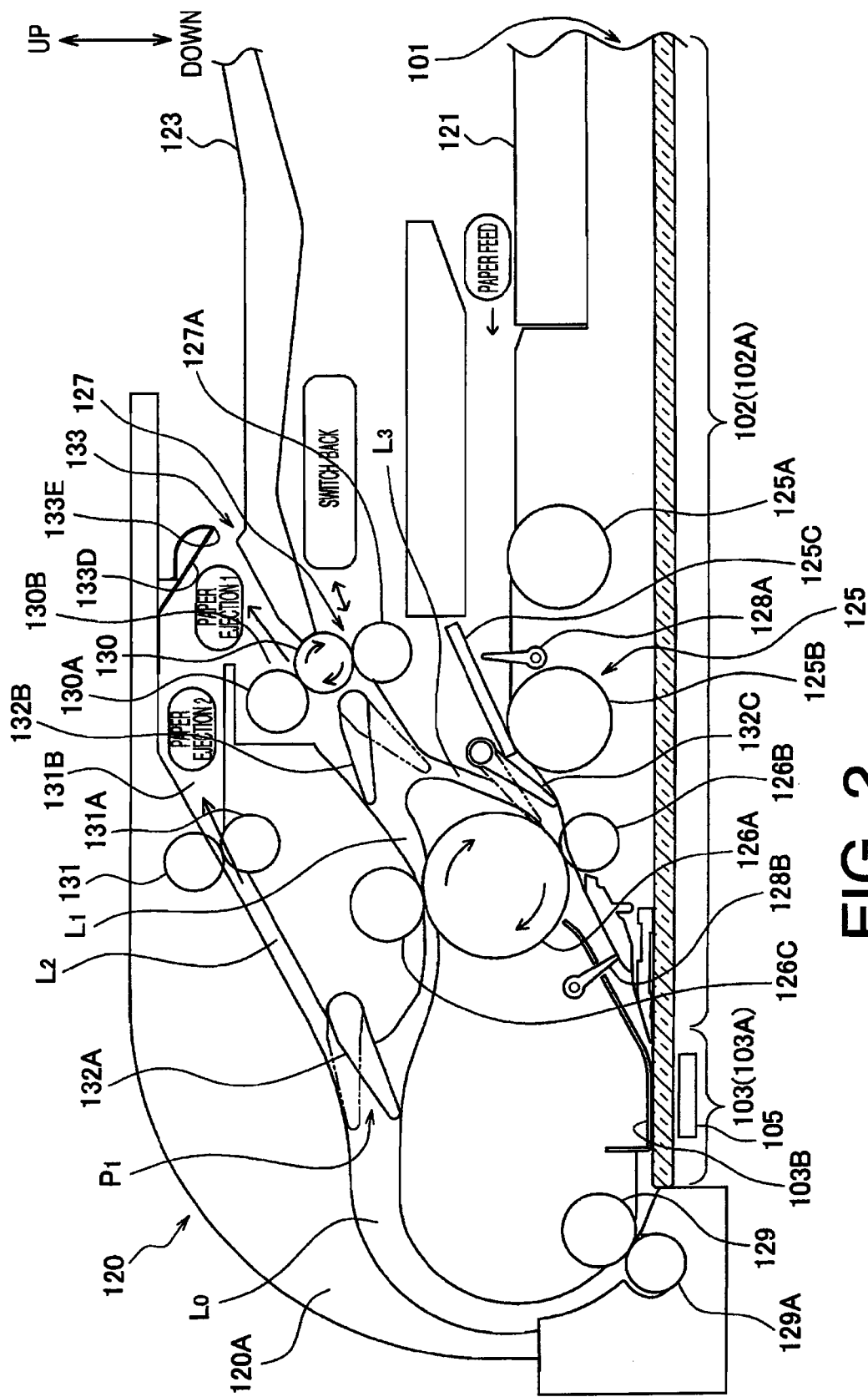
FIG. 2 is a cross section of the image reading device along a line A-A shown in FIG. 1.
Figure 3:
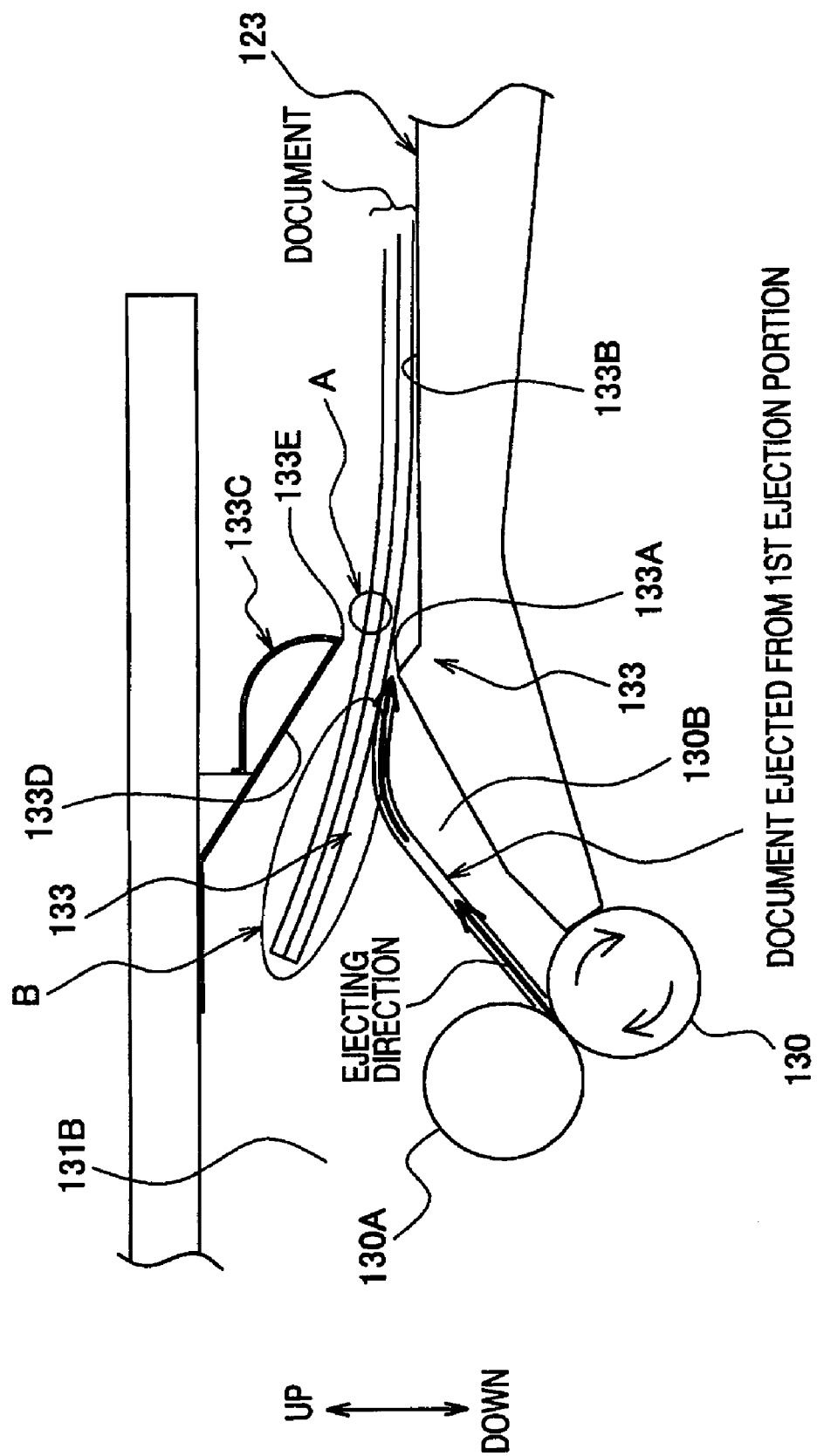
FIG. 3 is an explanatory illustration for explaining an operation of a sinking mechanism of the image reading device.
Figure 4:
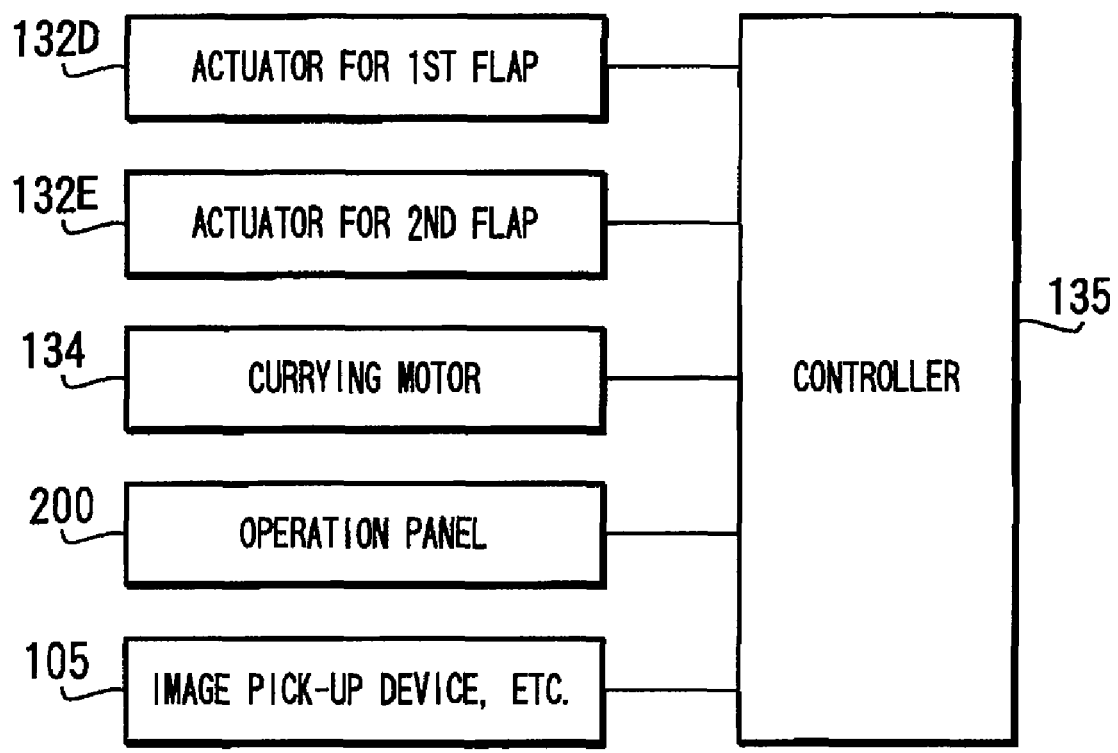
FIG. 4 is a block diagram illustrating a control system of the image reading device.
Figure 5:
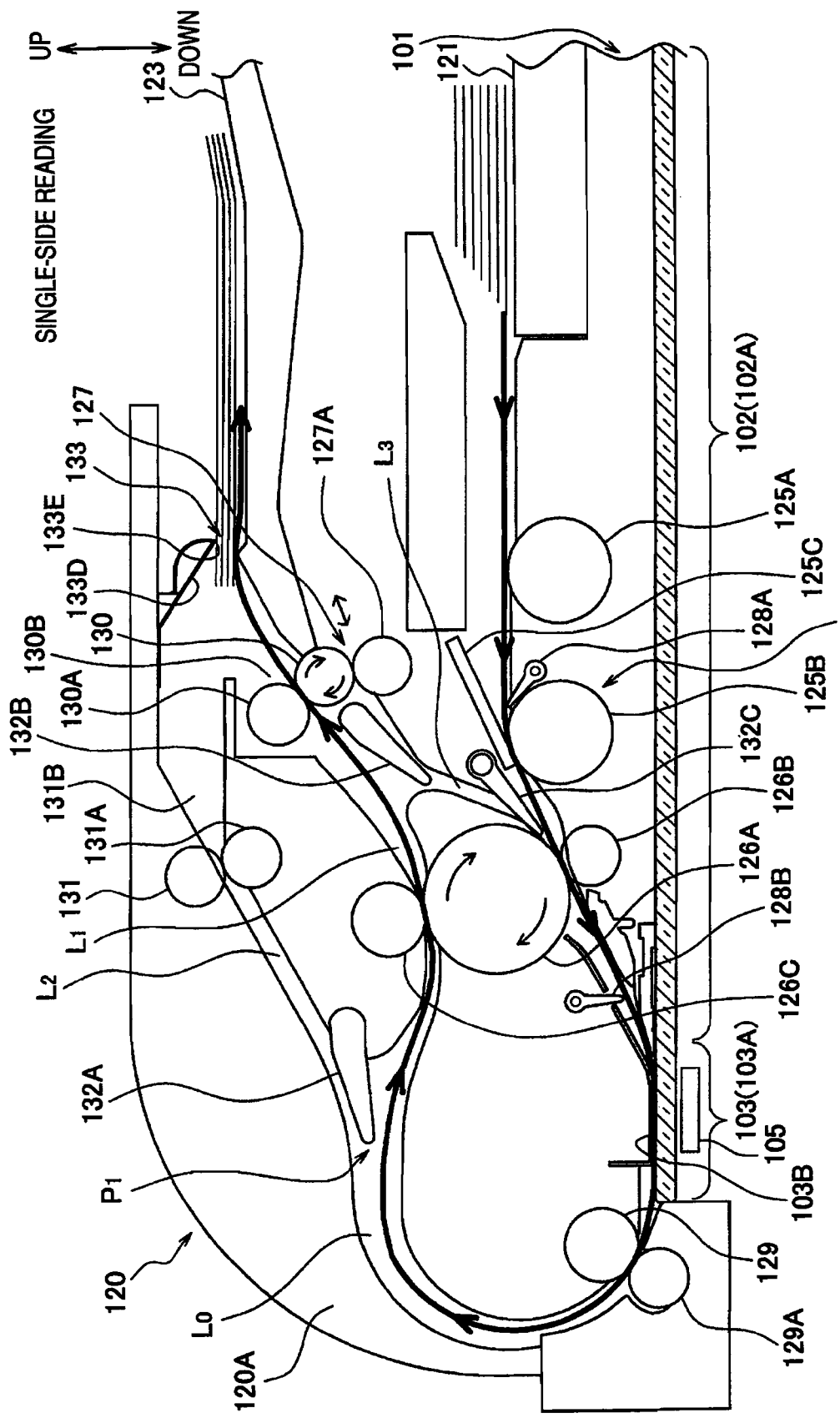
FIGS. 5 to 7 are explanatory illustrations for explaining operations of an automatic document feeding mechanism (ADF).
Figure 6:
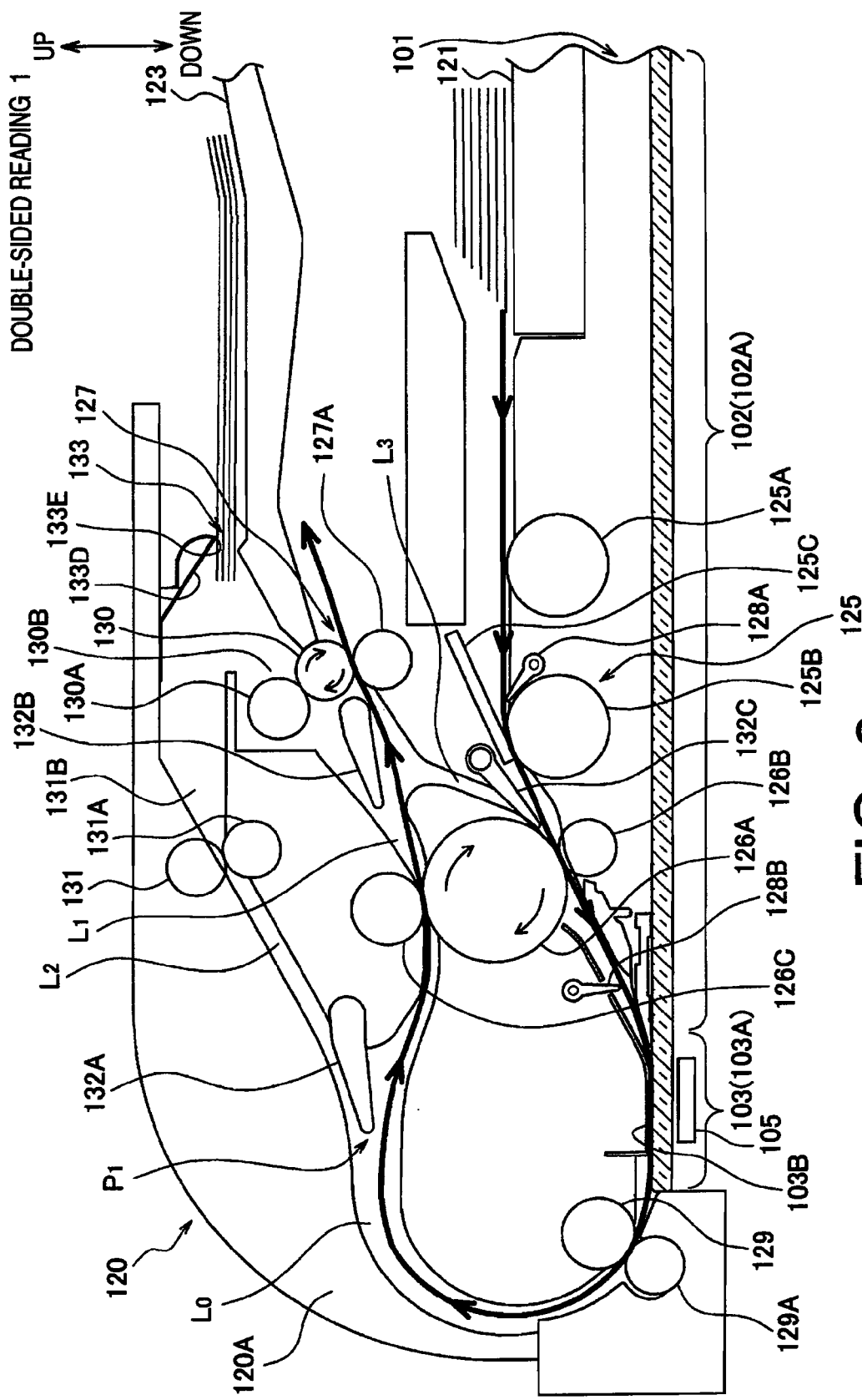
Figure 7:
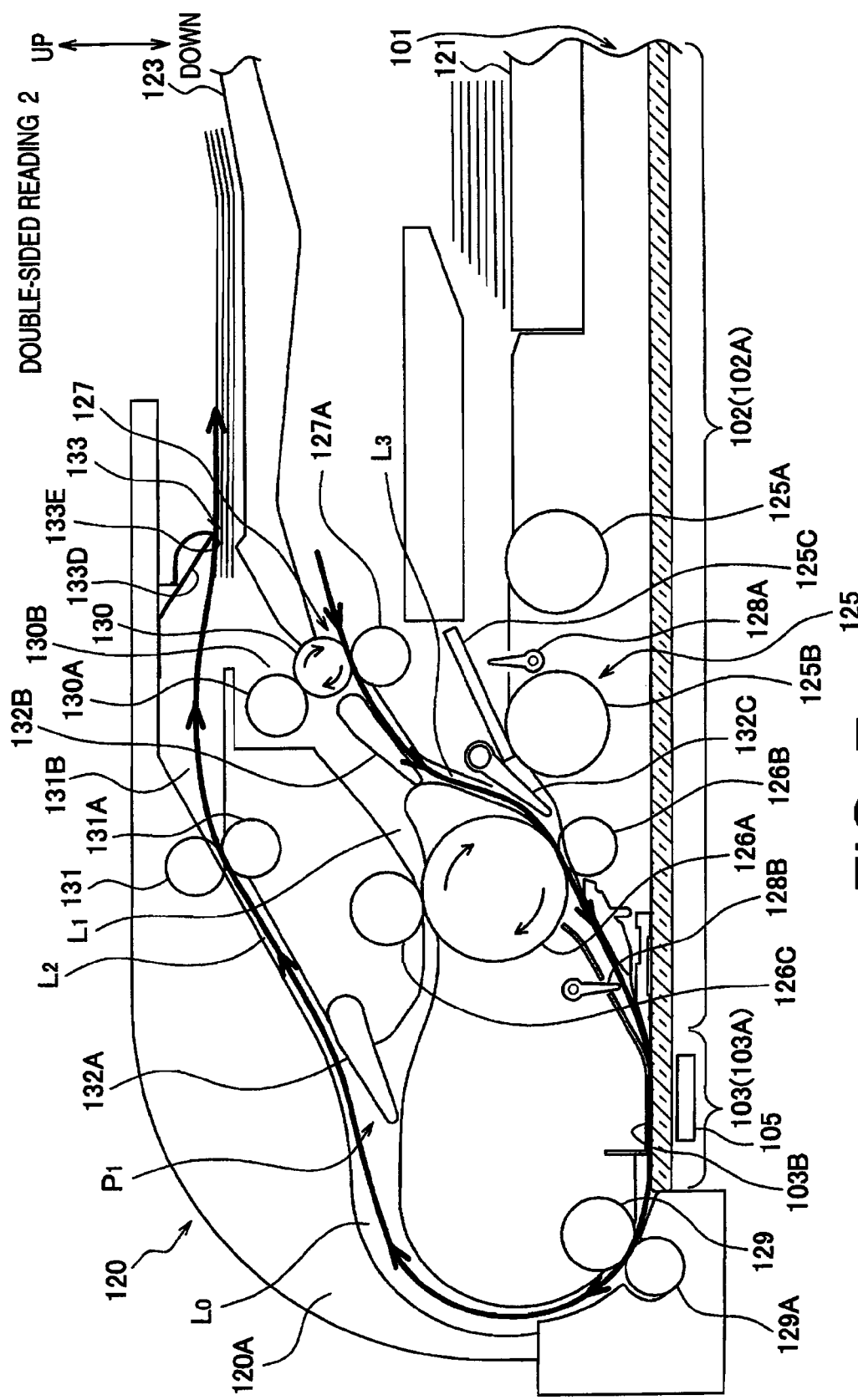
Figure 8:
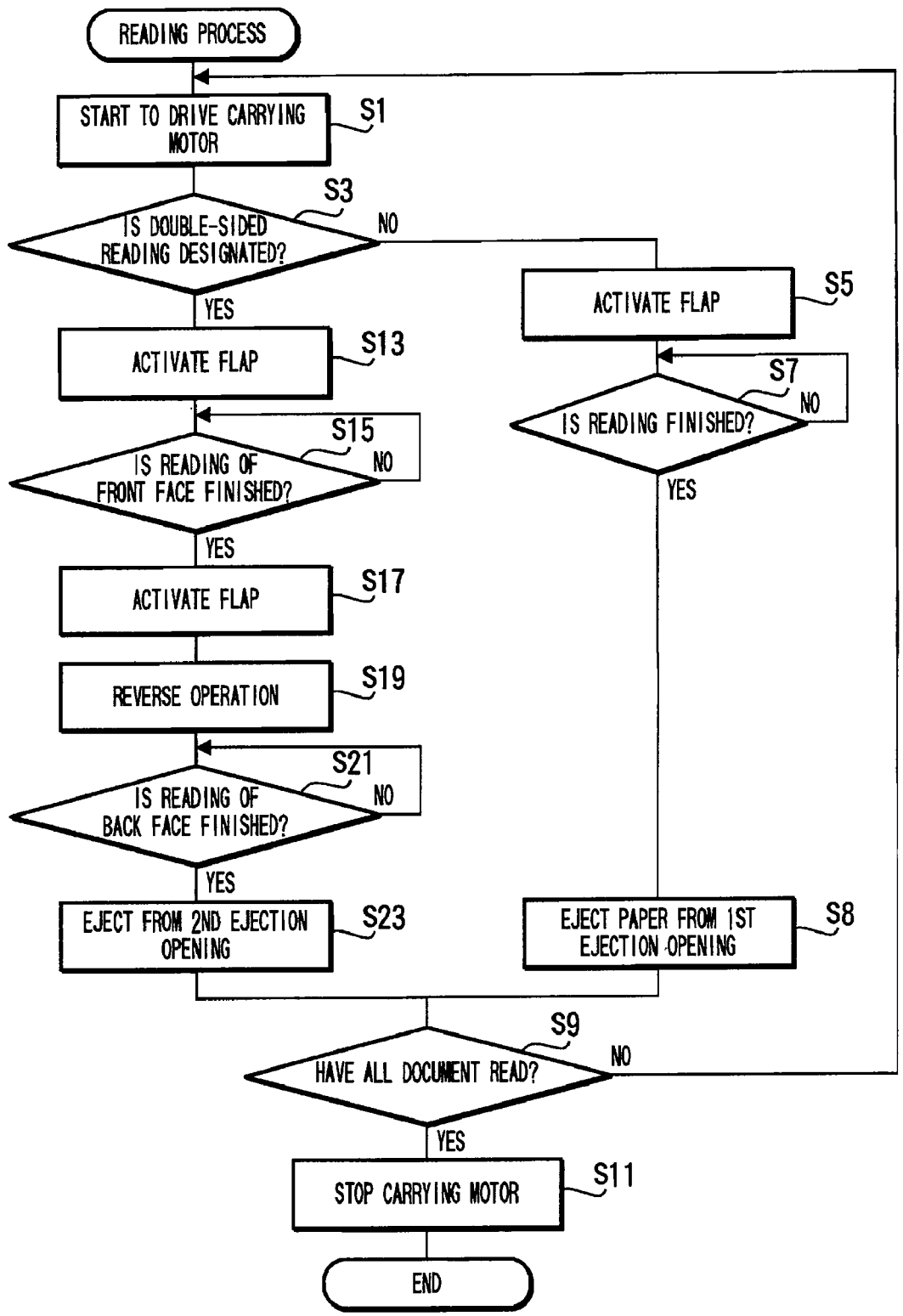
FIG. 8 is a flowchart illustrating control of the ADF according to the first embodiment.

FIG. 1 is a perspective view of an image reading device 100 viewed from the top side thereof. FIG. 2 is a cross section of the image reading device 100 along a line A-A shown in FIG. 1. FIG. 3 is an explanatory illustration for explaining an operation of a sinking mechanism 133. FIG. 4 is a block diagram illustrating a control system of the image reading device 100. FIGS. 5 to 7 are explanatory illustration for explaining operations of an automatic document feeding mechanism (ADF) 120. FIG. 8 is a flowchart illustrating control of the ADF 120.

As shown in FIG. 1, the image reading device 100 is provided with an operation panel 200 for operating and setting the image reading device 100 at the upper front portion, and is provided with a main body 101 for executing an automatic feed/read function and a still document read function.

On the operation panel 200, a display unit 201 for displaying various information such as setting data and messages, and key buttons 202 to be operated by a user are provided.

As shown in FIG. 2, in the main body 101 of the image reading device 100, an image reading window 102 used for the still document read function (hereafter, referred to as a still read window 102) and an image reading window 103 used for the automatic document fee/read function (hereafter, referred to as an automatic read window 103) are provided. Each of the still read window 102 and the automatic read window 103 is sealed by transparent platens 102A and 103A each of which is made of glass or acrylic.

In this embodiment, the platens 102A and 103A are formed of a glass plate. That is, the two types of platens 102A and 103A are integrally formed of a glass plate. A document cover 104 for covering the windows 102 and 103 is pivotally provided on the upper side of the main body 101. Therefore, when the document reading is performed through the still read window 102, the user opens the document cover 104 upward, and places a document on the still read window 102.

In the main body 101, an image pick-up device 105 configured to emit light to illuminate the document and to generate an electric signal in accordance with the received light is provided. The image reading device 100 executes the reading operation by converting the image formed on the document into the electric signal through the image pick-up device 105.

In this embodiment, the image pick-up device 105 is formed of a CIS (Contact Image Sensor) configured to be elongated in a direction perpendicular to the moving direction thereof beneath the reading windows 102 and 103.

The image pick-up device 105 is mounted in the main body 101 to be movable along a longitudinal direction of the image reading device 100 (i.e., a left and right direction on FIG. 2). During execution of the automatic feed/read function, the image pick-up device 105 reads the image from the document while being fixed at the position n beneath the automatic read window 103. On the other hand, when the still document read function is executed, the image pick-up device 105 reads the image from the document while being moved under the still read window 102.

At a portion of the document cover near the automatic read window 103, the ADF 120 configured to feed the document to the automatic read window 103 is provided.

The ADF 120 includes a document tray 121 on which a document to be read is placed. On the upper side of the document tray 121, an output tray 123 on which the document for which the image reading is completed is placed. Regarding the document having a plurality of sheets of paper, such document is placed on the document tray or the output tray in a state where the plurality of sheets of paper are stacked in a vertical direction.

Each of the document tray 121 and the output tray 123 is positioned in the horizontal direction to be shifted from the portion (hereafter referred to as a mechanism body portion 120A) corresponding to the automatic read window 130. In FIG. 2, the document tray 121 and the output tray 123 are positioned to be shifted rightward from the mechanism body portion 120A.

The document tray 121 is provided with, on the side of the mechanism body portion 120A, a feeder mechanism 125 configured to feed the document to the automatic read window 103. More specifically, the feeder mechanism 125 operates to feed the stacked sheets of paper (document) one by one from the bottom side of the stacked sheets of paper. The feeder mechanism 125 includes a feed roller 125A, a separation roller 125B, and a separation pad 125C.

The feed roller 125A feeds the sheet of paper to the separation roller 125B by rotating and contacting the under surface of the sheet of paper positioned at the bottom of the stacked sheets of paper and. The separation roller 125B also rotates while contacting the under surface of the sheet of paper so as to apply a carrying force to the sheet of paper. The separation pad 125C is positioned to contact the sheet of paper on the opposite side of the separation roller 125B while sandwiching the sheet of paper between the separation pad 125C and the separation roller 125B to apply carrying resistance.

By this structure, only the sheet of paper contacting the separation roller 125B is carried from the separation roller 125B. The sheets of paper located on the side of the separation pad 125C with respect to the sheet of paper contacting the separation roller 125B is stopped by the carrying resistance from the separation pad 125C. Thus, the stacked sheets of paper are fed to the automatic read window 103 one by one from the bottom of the stacked sheets of paper.

A carrying roller 126A rotates while contacting, at the lower surface thereof, the sheet of paper fed by the separation roller 125B so that the sheet of paper is carried to the automatic read window 103. Further, the carrying roller 126A carries the sheet of paper which has passed the automatic read window 103 to a reversing mechanism 127 (which is described in detail later) or a $1^{st}$ ejection roller 130 side, by rotating and contacting the sheet of paper at the upper surface of the carrying roller 126A.

Each of pinch rollers 126B and 126C functions as a pressing roller for pressing the sheet of paper against the carrying roller 126A. Each of the pinch rollers 126B and 126C is a driven roller being driven by contacting the sheet of paper being carried.

A first document sensor 128A is located on the upstream side of the separation roller 125B to detect presence/absence of the document on the document tray 121. A second sensor 128B is located on the upstream side of a presser foot 103B to detect passage of the sheet of paper.

The presser foot 103B is positioned to face the automatic read window 103 to form a predetermined gap with respect to the automatic read window 103. The presser foot 103B presses the sheet of paper being carried. In this embodiment, the second sensor 128B outputs an ON signal when the sheet of paper is passing, while the second sensor 128B outputs an OFF signal when the sheet of paper is not passing.

A carrying roller 129 is located, on the downstream of the automatic read window 103, at the position shifted from the platen 103A. The carrying roller 129 carries the sheet of paper which has passed the automatic read window 103, to the output tray 123. The sheet of paper to which the carrying force is applied by the carrying roller 129 turns upwardly by approximately 180 degrees, and is ejected to the output tray 129.

The pinch roller 129A functions as a presser roller for pressing the sheet of paper against the carrying roller 129. The pinch roller 129A is a driven roller being driven by contacting the sheet of paper being carried.

A carrying path L0 formed on the downstream side of the carrying roller 129 branches into carrying paths L1 and L2. The carrying path L1 branched from a branch point P1 on the lower side is provided with a first ejection roller 130, and the carrying path L2 branched from the branch point P1 on the upper side is provided with a second ejection roller 131.

The first ejection roller 130 serves to eject the sheet of paper which has passed the automatic read window 103 and has carried to the carrying path L1, to the output tray 123, and to reverse the carrying direction to carry again the sheet of paper to the automatic read window 103.

That is, by rotating the first ejection roller 130 of which upper surface is contacting the sheet of paper, the sheet of paper carried to the carrying path L1 is ejected to the output tray 123. By rotating the first ejection roller 130 of which lower surface is contacting the sheet of paper, the carrying direction of the sheet of paper carried to the carrying path L1 is reversed.

Therefore, according to the first embodiment, the reversing mechanism is formed by the first ejection roller 130 and a pinch roller 127A which is located under the first ejection roller 130 to press the sheet of paper against the first ejection roller 130.

A pinch roller 130A is located over the first ejection roller 130 to press the sheet of paper against the first ejection roller 130. Therefore, the pinch roller 130A and the first ejection roller forms a (first) ejection unit. Hereafter, when the sheet of paper is ejected by the first ejection roller 130 to the output tray 123, such a motion is frequently expressed by a passage like "ejecting the sheet of paper from a first ejection opening 130B".

The second ejection roller 131 ejects the sheet of paper for which the image reading has been finished, to the output tray 123 by rotating and contacting the sheet of paper. The second ejection roller 131 is positioned upward with respect to the first ejection roller 130 and is positioned, in the horizontal direction, on the side of the automatic read window 103 with respect to the first ejection roller 130. That is, in this embodiment, the position of the first ejection roller 130 is nearer to the output tray 123 that the position of the second ejection roller 131.

Therefore, the second dejection roller 131 and a pinch roller 131A which is located under the second ejection roller 131 to press the sheet of paper against the second ejection roller form a (second) ejection unit. Hereafter, when the sheet of paper is ejected by the second ejection roller 131 to the output tray 123, such a motion is frequently expressed by a passage like "ejecting the sheet of paper from a second ejection opening 131B".

A first flap 132A is located at the branch point P1, and serves as a (first) branching unit to switch the carrying path of the sheet of paper between the carrying path L1 and the carrying path L2.

A second flap 132B is located on the upstream side of the first ejection roller 130, and serves as a (second) branching unit to switch the carrying path of the sheet of paper between the carrying path toward the first ejection opening 130B and the carrying path toward the reversing mechanism 127.

A third flap 132C is located at a confluent point of the carrying path L3 starting from the reversing unit 127 toward the automatic read window 103 and the carrying path starting from the document tray 121 toward the automatic read window 103. The third flap 132C serves as a (third) branching unit.

The first flap 132A and the second flap 132B is actively controlled by actuators 132D and 132E, respectively (see FIG. 4), while the third flap 132C is not actively controlled. That is, first to third flaps 132A-132C are pivotally mounted in the mechanism body portion 120A. The first and second flaps 132A and 132B are actively driven by the actuators 132D and 132E, respectively to move between a position indicated by a solid line and a position indicated by a dashed line as shown in FIG. 2.

On the other hand, as indicated by a solid line in FIG. 2, the third flap 132C is positioned by its own weight to open the carrying path L3 starting from the reversing mechanism 127 toward the automatic read window 103 and to close the carrying path starting from the paper tart 121 toward the automatic read window 103. When the sheet of paper is carried from the document tray 121 to the automatic read window 103, the third flap 132C swings to the position indicated by a double chain line in FIG. 2 by being pressed by the sheet of paper being carried, so that the carrying path starting from the document tray 121 to the automatic read window is opened. When the carrying of the sheet of paper from the document tray 121 to the automatic read window 103 is finished, the third flap 132C returns to the position indicated by the solid line in FIG. 2 by its own weight.

On the side of the first ejection opening 130B on the output tray 123, the sinking mechanism 133 is provided. The sinking mechanism 133 serves to sink the sheet of paper ejected from the first ejection opening 130B into the position between the sheets of paper which have been stacked on the output tray 123 and the surface of the output tray 123.

As shown in FIG. 3, the sinking mechanism 133 includes a projected part 133A and a flat part 133B connecting to the output tray 123. The projected part 133A serves to lift, on the side of the first ejection opening 130B, the sheets of paper stacked on the output tray 123, and the flat part 133B is formed to extend form the projected part 133A toward the opposite side of the first ejection opening 130B to be connected to the output tray 123, so that the sheet of paper ejected from the first ejection opening 130B contacts the sheets of paper lifted upward by the projected part 133A.

In this structure, the sheet of paper ejected from the first ejection opening 130B contacts in an acute angle a part (a part B shown in FIG. 3) of the under surface of the lowest one of the sheets of paper stacked on the output tray 123, and turns toward the flat part 133B. Therefore, the sheet of paper ejected from the first ejection opening 130B is placed on the output tray 123 to be sunk into the position between under surface of the stacked paper and the surface of the output tray 123.

A guide 133C serves to guide the sheet of paper ejected from the second ejection opening 131B to the output tray 123, and to press, on the side of the flat part 133B with respect to the projected part 133, the lifted portion of the sheets of paper stacked on the output tray 123 lifted by the projected part 133A, so that the portion of the stacked paper on the output tray 123 is reliably lifted.

A lower surface 133D of the guide 133C functions as a chute surface to direct the sheet of paper being ejected from the second ejection opening 131B toward the output tray 123, and a tip part of the guide 113C functions as a pressing member to press the sheets of paper placed on the output tray 123 against the flat part 133B.

FIG. 4 illustrates a block diagram of a control system for the ADF 120. The control system of the ADF 120 includes a controller 135, the actuators 132D and 132E, a carrying motor 134, a carrying motor 134 for driving and rotating various rollers, the operation panel 200 and the image pick-up device 105. The controller 135 is formed of a microcomputer chip on which a CPU, a ROM, a RAM and various peripheral components are embedded. The ROM stores various types of programs including a carrying control program which is explained later with reference to FIG. 8. The controller 135 controls the actuators 132D and 132E and the carrying motors in accordance with the carrying control program.

As described below, the ADF 120 is capable of performing the single-side reading and the double-sided reading. In the following, general operations for the single-side reading and the double-sided reading are explained first, and then the detailed operations are explained with reference to drawings (e.g., a flowchart shown in FIG. 8).

First, the single-side reading is explained.

When a single-side reading mode is selected by the user through the operation panel 200, the sheet of paper (document) is carried as shown in FIG. 5. Specifically, when a read start button (not shown) is pressed by the user in a stat where the plurality of sheets of paper (document) are placed on the document tray 121 such that each reading surface faces downward, the carrying motor 134 is rotated and the sheets of paper stacked on the document tray 121 are fed to the automatic read window 103 one by one from the lowermost one of the stacked sheets of paper.

Since the single-side reading mode is selected, the controller 135 drives the first flap 132A to open the carrying path L1 and to close the carrying path L2 as shown in FIG. 5. Further, the controller 135 drives the second flap 132B to carry the sheet of paper from the carrying path L1, toward the first ejection opening 130B.

Therefore, the sheet of paper for which the image reading has finished is ejected to the output tray 123 through the carrying path L1 and the first ejection opening 130B as indicated by a thick arrow in FIG. 5. Consequently, each ejected sheet of paper is sunk into the lowermost position of the sheets of paper stacked on the output tray 123 by the sinking mechanism 133.

In the single-side reading mode, the sheets of paper are stacked on the output tray 123 one by one from the bottom side to the top side so that the reading surface faces upward. In other words, in the single-side reading mode, the stacked sheets of paper placed on the document tray 121 are placed on the output tray 123 in a vertically flipped state.

Hereafter, the double-sided reading is described. When the user selects the double-sided reading mode through the operation panel 200, the image reading for the front-face of the sheet of paper (document) is performed by carrying the sheet of paper as indicated by a thick arrow in FIG. 6. Subsequently, the carrying direction of the sheet of paper is reversed, and the image reading of the back-face of the sheet of paper (document) is performed as indicated by a thick arrow show in FIG. 7. Then, the sheet of paper (document) is ejected to the output tray 123.

Specifically, when the read start button is pressed by the user in a stat where the plurality of sheets of paper (document) are placed on the document tray 121 such that each reading surface faces downward, the carrying motor 134 is rotated and the sheets of paper stacked on the document tray 121 are fed to the automatic read window 103 one by one from the lowermost one of the stacked sheets of paper to read the front-face of the sheet of paper.

Since the double-sided reading mode is selected, the controller 135 drives the first flap 132A to open the carrying path L1 and to close the carrying path L2 first as shown in FIG. 6. Further, the controller 135 drives the second flap 132B to carry the sheet of paper from the carrying path L1, toward the reversing mechanism 127.

Therefore, the sheet of paper for which the image reading is finished is carried to the reversing mechanism through the carrying path L1 as indicated by the thick arrow shown in FIG. 6, and when the rear edge of the sheet of paper passes the second flap 132B, the controller 135 drives the second flap 132B to close the carrying path for the first ejection opening 130B, drives the first flap 130 to close the carrying path L1 and to open the carrying path L2, and then rotates the first ejection roller 130.

By such control, the sheet of paper (document) of which front-face has been read is carried again to the automatic read window 103 to read the back-face of the sheet of paper as shown in FIG. 7. The sheet of paper for which the double-sided reading is finished is ejected to the output tray 123 through the second ejection opening 131B as shown in FIG. 7.

Since the sheet of paper is ejected to the output tray 123 through the second ejection opening 131B, the sheets of paper are ejected to the output tray 123 one by one to be stacked on the uppermost one of the stacked sheets of paper.

Consequently, in the double-sided mode, each sheet of paper for which the image reading is finished is stacked from the bottom toward the top on the output tray 123 such that the front-face of each sheet of paper faces downward. In other words, the sheets of paper (document) stacked on the document tray 121 are stacked on the output tray 123 as it is.

Hereafter, the carrying control process is explained with reference to FIG. 8. The carrying control process is executed under control of the controller 135 when the read start button is pressed by the user.

When the carrying control process is started, the controller 135 starts to rotate the carrying motor 134 (step S1). Then, the controller 135 judges whether the double-sided mode is selected by the user (step S3).

When the single-side mode is selected by the user (S3: NO), the controller 135 controls the first flap 132A and the second flap 132B to move to the state shown in FIG. 5 (step S5). Then, the controller 135 judges whether the image reading through the automatic read window 103 has finished in accordance with a signal from the second sensor 128B (step S7)

In this embodiment, the controller 135 is able to judge whether the image reading through the automatic control window is finished by judging whether a predetermined time period has passed from the time of transition from the OFF state to the ON state of the output signal of the second sensor 128B or the time of transition from the ON state to the OFF state of the output signal of the second sensor 128B. Specifically, the controller 135 judges that the image reading is finished when the predetermined time period has passed from the above described reference time. On the other hand, the controller 135 judges that the image reading is not finished before the predetermined time period has passed from the above described reference time.

When the controller 135 judges that the image reading is finished (S7: YES), the sheet of paper is ejected through the first ejection opening 130B (step S8). The controller waits until the image reading is finished (step S7: NO).

Next, the controller 135 judges whether all the sheets of paper (document) placed on the document tray 131 have read (step S9). When all the sheets of paper have read (S9: YES), the controller 135 stop the carrying motor 134. Then, the carrying control process is terminated. When all of the sheets of paper have not been read (S9: NO), control returns to step S1.

If it is judged that the double-sided reading mode is selected in step S3 (S3: YES), the first flap 132A and the second flap 132B are driven to move to the sate shown in FIG. 6 (step S13). Then, the controller 135 judges whether the reading for the front-face is finished in accordance with the output signal from the second sensor 128B (step S15).

If it is judged in step S15 that the image reading for the front-face is finished (S15: YES) the first flap 132A and the second flap 132B are driven to move to the state shown in FIG. 7 (step S17). Then, the controller 135 starts to control the reversing mechanism 127 (step S119).

Next, the controller 135 judges whether the image reading for the back-face is finished (step S21). If it is judged that the image reading for the back-face is finished (S21: YES), the first flap 132A is driven to move to the state shown in FIG. 7 (step S23).

After the sheet of paper (document) is ejected through the second ejection opening 131B, the controller 135 judges whether all of the sheets of paper of the document placed on the document tray 121 have been read (step S9). The controller 135 waits until all of the sheets of paper have been read (S9: NO).

Since the image reading is performed as described above, the ADF 120 is able to prevent the page sequence of the sheets of paper placed on the document tray 121 and the page sequence of the sheets of paper placed on the output tray 123 from becoming different from each other.

Considering the case where two sheets of paper (hereafter, referred to as document A and document B) are placed on the document tray 121, the front-face of the document A is defined as page 1, the back-face of the document A is defined as page 2, the front-face of the document B is defined as page 3, and the back-face of the document B is defined as page 4, and the documents A and B are stacked on the document tray 121 such that each front-face faces downward, in this case by executing the image reading in the double-sided reading mode, the documents A and B for which the image reading is finished are ejected to the output tray 123 through the second ejection opening 131B such that each front-face faces downward and that the document B is stacked on the document A.

Therefore, on the output tray 123, the pages 1 to 4 are arranged in this order from the bottom to the top. Therefore, the page sequence of the documents placed on the document tray 121 is equal to the page sequence of the documents on the output tray, 123.

On the other hand, in the case of the single-side reading mode, the document for which the image reading is finished is ejected to the output tray 123 through the first ejection opening 130B and the documents A and B are stacked on the output tray 123 such that the document A is stacked on the document B and each front-face faces upward. Therefore, in the single-side reading mode, the page sequence of the documents placed on the document tray 121 is equal to the page sequence of the documents placed on the output tray 123.

Therefore, according to the first embodiment, it is prevented that the page sequence of a plurality of sheets of paper (documents) on the document tray 121 becomes different from the page sequence of the plurality of sheets of paper on the output tray 123. Further, in the first embodiment, only one output tray is provided. It is understood that, in contrast to the configuration disclosed in JP HEI 11-314856A, the ADF 120 according to the embodiment is able to eliminate the need for checking which of output trays is used for ejecting the sheets of paper. Therefore, usability of the image reading device 100 can be enhanced.

As described above, the embodiment achieves the configuration where only one output tray is provided, while preventing that the page sequence of the sheets of paper on the document tray 121 becomes different from the page sequence of the sheets of paper on the output tray 123. Therefore, the user does not need to check which of output trays is used for ejecting the sheets of paper. Consequently, usability of the automatic document feeder capable performing the double-sided reading and the single-side reading can be enhanced.

As described above, the sinking mechanism 133 sinks the sheet of paper into the position between the stacked sheets of paper already stacked on the output tray 123 and the surface of the output tray 123. Therefore, it is preferable that the sinking mechanism 133 and the output tray 123 are located close to each other.

In this regard, in this embodiment, the first ejection roller 130 is located on the lower side of the second ejection roller 131, at the position closer to the output tray 123 in comparison with the second ejection roller 131. Therefore, it becomes possible to sink the sheet of paper ejected from the first ejection opening 130B into the position under the stacked sheets of paper already stacked on the output tray 123.

It is noted that since the sinking mechanism 133 is configured to sink the sheet of paper into the position under the stacked sheets of paper already stacked on the output tray 123, it is required to secure adequate space over the first ejection roller 130.

In this regard, in this embodiment, the output tray 123 is positioned on a side with respect to the mechanism body portion 120A in the horizontal direction, and the second ejection roller 131 is positioned closer to the mechanism body portion 120A in comparison with the first ejection roller 130 in the horizontal direction. Therefore, in this arrangement, the second ejection roller 131 is shifted from the first ejection roller 130 in the horizontal direction.

Such a configuration makes it possible to secure space over the first ejection roller 130 and to prevent an erroneous action from occurring in the sinking mechanism 133.

Since the sheet of paper (document) for image reading is carried from the side of the still read window 102 to the side of the automatic read window 103, it is possible to located the carrying roller 129 to be shifted from the platen 103A.

According to the embodiment, each of the platens 102A and 103A may be integrally formed by a single glass plate (i.e., the two types of the platens 102A and 103A can be integrally formed), it becomes possible to downsize the image reading device 100 in the longitudinal direction.

Second Embodiment

Hereafter, a second embodiment is described.

In the above described first embodiment, the output tray 123 is positioned on the upper side of the document tray 121, and the sheets of paper placed on the document tray 121 are read one by one from the sheet of paper at the bottom of the stacked sheets. By contrast, in the second embodiment, the document tray 121 is positioned on the upper side of the output tray 123, and the sheets of paper placed on the document tray 121 is read one by one from the sheet of paper at the top of the stacked sheets.

Figure 9:
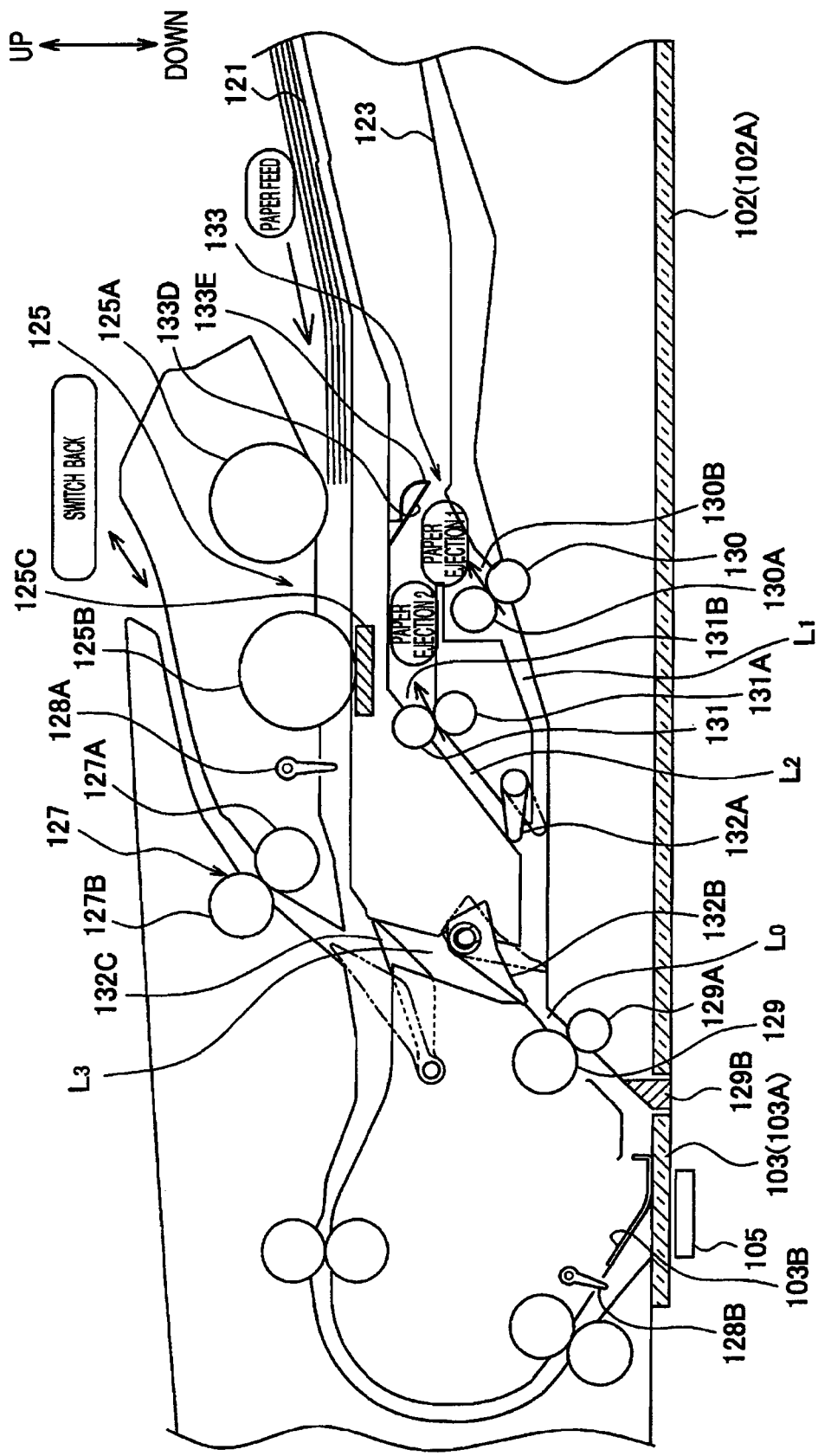
FIG. 9 illustrates a general configuration of an automatic document feeder according to a second embodiment.

FIG. 9 illustrates a general configuration of an automatic document feeder 120X according to the second embodiment. In FIG. 9 (and in the following drawings), to elements which are substantially the same as those of the first embodiment, the same reference numbers are assigned, and explanations thereof will not be repeated. In the following, the explanations focus on the feature of the second embodiment.

In the first embodiment, the roller used for the reversing mechanism 127 is also used as the first ejection roller 130. By contrast, according to the second embodiment, a reversing drive roller 127B dedicated for the reversing mechanism 127 is provided. Therefore, a pinch roller 127A serves to press the sheet of paper against the reversing drive roller 127B.

As in the case of the first embodiment, the third flap 132C is configured to swing by its own weight. However, in contrast to the first embodiment, the third flap 132C actions to close the carrying path L3 starting from the automatic read window 103 to the reversing mechanism 127 and to open the carrying path starting from the document tray 121 to the automatic read window 103 by its own weight.

In the first embodiment, the feeder mechanism 125 is configured such that the feed roller 125A and the separation roller 125B rotate and contact the sheet of paper at the bottom of the stacked sheets so that the staked sheets of paper are fed one by one from the sheet of paper at the bottom of the stacked sheets. By contrast, according to the second embodiment, the feed roller 125A and the separation roller 125B rotate and contact the sheet of paper at the top of the stacked sheets so that the stacked sheets of paper is fed one by one from the sheet of paper at the top of the stacked sheets.

In the second embodiment, the platen 102A for the still read window 102 and the platen 103A for the automatic read window 103 are formed of separates glass plates (see FIG. 9). Between the platen 102A and the platen 103A, a turning plate 125B for turning the sheet of paper carried to the automatic read window 103 toward the side of the carrying roller 129 by scooping the leading edge of the sheet of paper (i.e., the leading edge in the carrying direction) is provided. To scoop the leading edge of the sheet of paper upward, the turning plate 125B is configured to have a triangular cross-sectional shape.

Hereafter, the image reading in the single-side reading mode is described.

Figure 10:
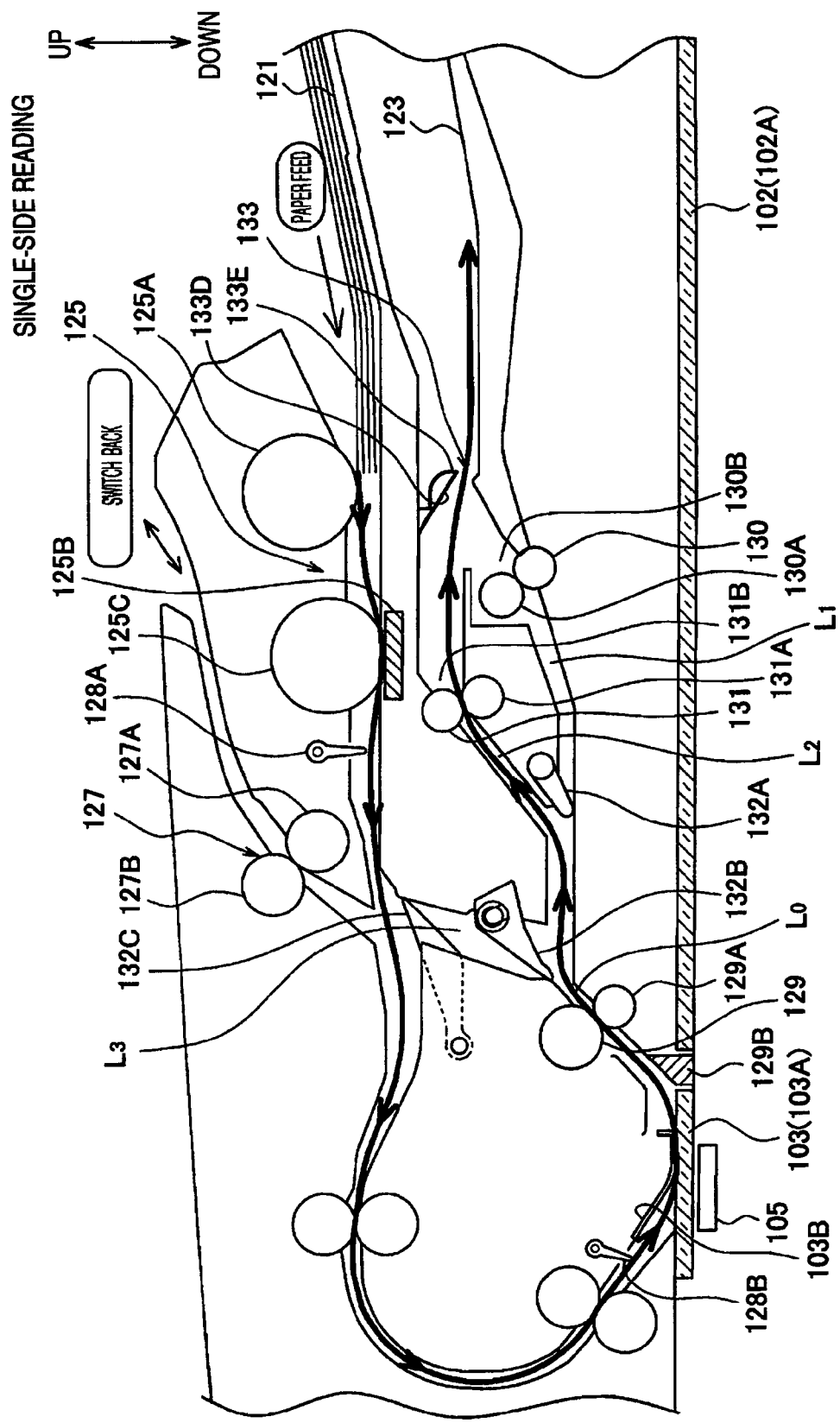
FIGS. 10 to 12 are explanatory illustrations for explaining operations of an ADF according to the second embodiment.

When the user selects the single-side reading mode through the operation panel 200, the sheet of paper is carried as indicated by a thick arrow in FIG. 10.

Specifically, when the read start button is pressed in a state where a plurality of sheets of paper (document) are placed on the document tray with each reading surface facing upward, the controller 135 starts to rotate the carrying motor 134, and the image reading is started by feeding the sheets of paper one by one from the sheet of paper at the top of the stacked sheets.

Since the single-side reading mode has been selected, the controller 135 drives the second flap 132B such that the sheet of paper for which the image reading is finished and which has carried to the carrying path L0 is carried to the carrying path L2, and drives the first flap 132A such that the carrying path L1 is closed and the carrying path L2 is opened.

Therefore, the sheet of paper for which the image reading is finished is ejected to the output tray 123 through the carrying path L2 and the second ejection opening 131B. Consequently, the sheet of paper is stacked on the stacked sheets of paper already stacked on the top of the output tray 123 such that each reading surface faces downward.

Therefore, in the single-side reading mode, the sheets of paper are stacked on the output tray 123 from the bottom to the top such that each reading surface faces downward. In other words, in the single-side reading mode, the stacked sheets of paper placed on the document tray 121 are stacked on the output tray 123 in a state of being vertically flipped.

Hereafter, the image reading in the double-sided reading mode is explained.

Figure 11:
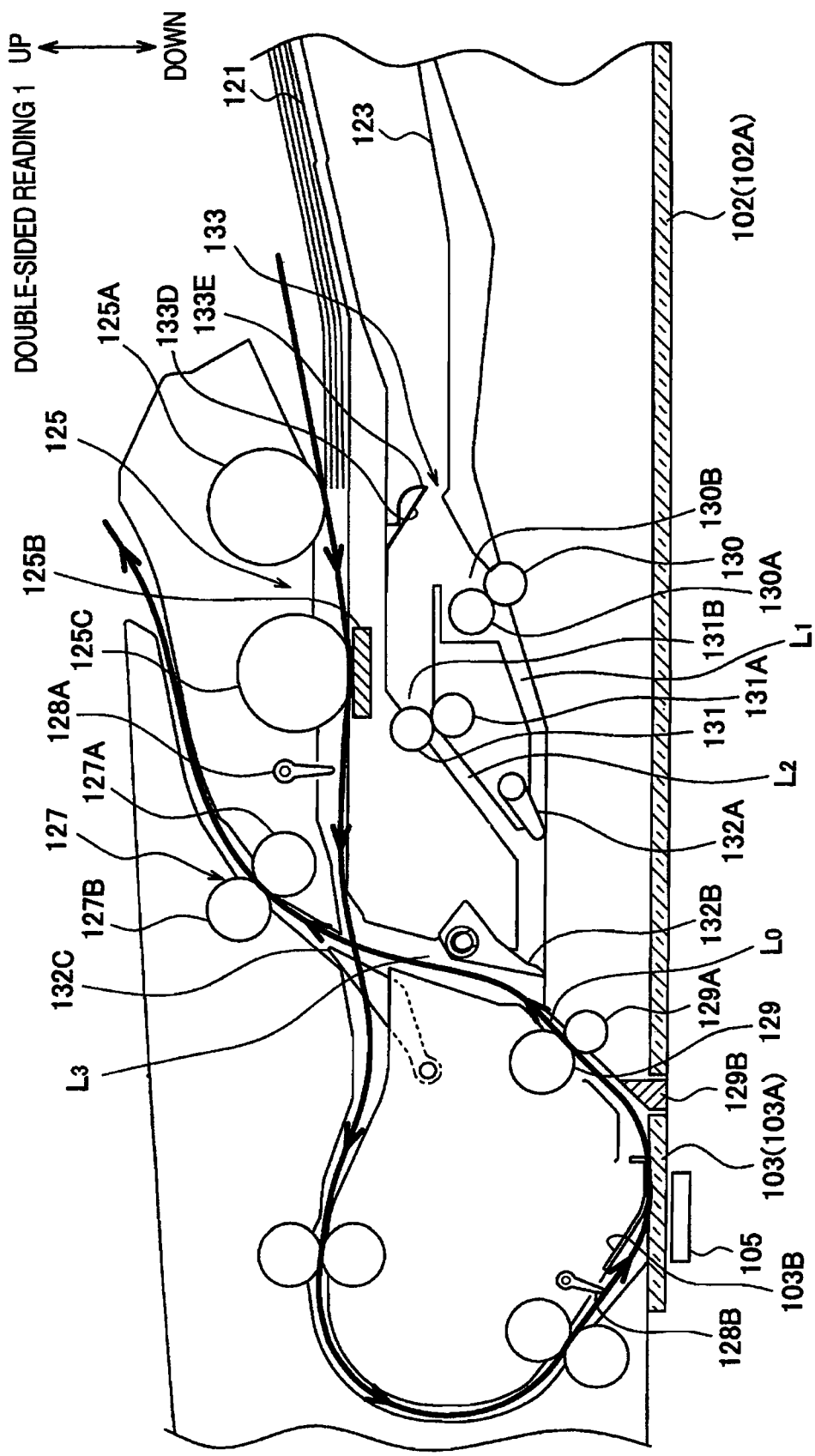

When the user selects the double-sided reading mode through the operation panel 200, the sheet of paper is carried as indicated by a thick arrow in FIG. 11 to read the front-face. Next, the carrying direction is reversed, and the sheet of paper is carried as indicated by a thick arrow in FIG. 12 to read the back-face. Thereafter, the sheet of paper is ejected to the output tray 123 through the first ejection opening 130B.

That is, when the user presses the read start button in a state where a plurality of sheets paper are placed on the document ray 121 such that each reading surface faces upward, the controller 135 starts to rotate the carrying motor 134, and the image reading is started by feeding the sheets of paper one by one from the sheet of paper at the top of the stacked sheets to the automatic read window 103 so as to read the front-face.

Since the double-sided reading mode has been selected, the controller 135 drives the second flap 132B so that the carrying path L3 starting from the automatic read window 103 to the reversing mechanism 127 is opened.

Therefore, as indicated by the thick arrow in FIG. 11, the sheet of paper for which the image reading is finished is carried to the side of the reversing mechanism 127 through the carrying path L0 and the carrying path L3. It should be noted that the third flap 132C swings to the state shown in FIG. 11 by being pressed by the leading edge of the sheet of paper being carried.

Figure 12:
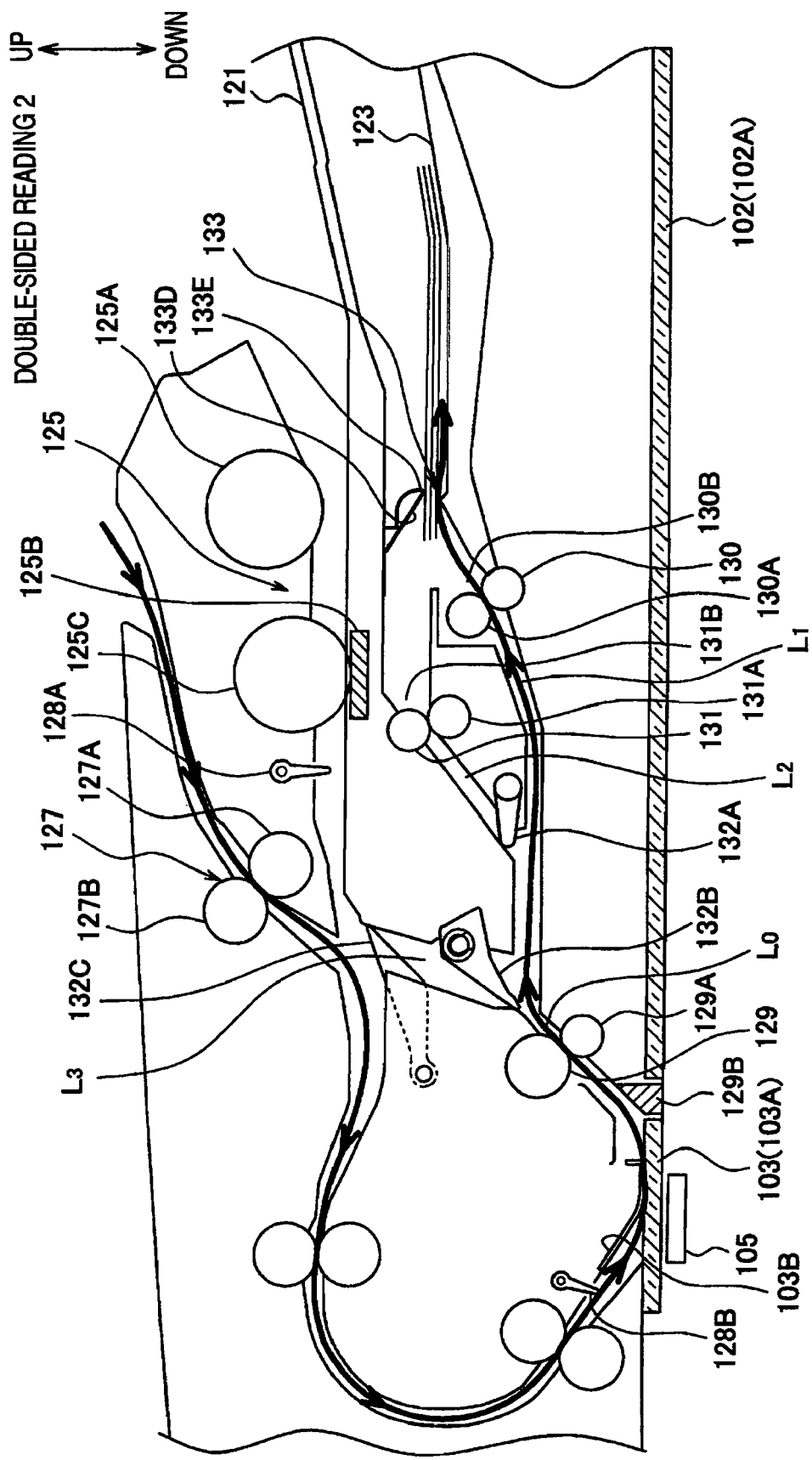

When the rear edge of the sheet of paper passes the third flap 132C, the controller 135 drives the second flap 132B so that the sheet of paper for which the image reading is finished and which has carried to the carrying path L0 is carried to the carrying path L1, drives the first flap 132A to close the carrying path L2 and to open the carrying path L1, and reverses the rotation of the reversing drive roller 127B (see FIG. 12).

Therefore, in the double-sided mode, the sheets of paper are stacked on the output tray in order of completion of image reading such each front-face faces upward. In other words, in the double-sided mode, the plurality of sheets of paper stacked on the document tray 121 are stacked on the output tray 123 as it is.

Figure 13:
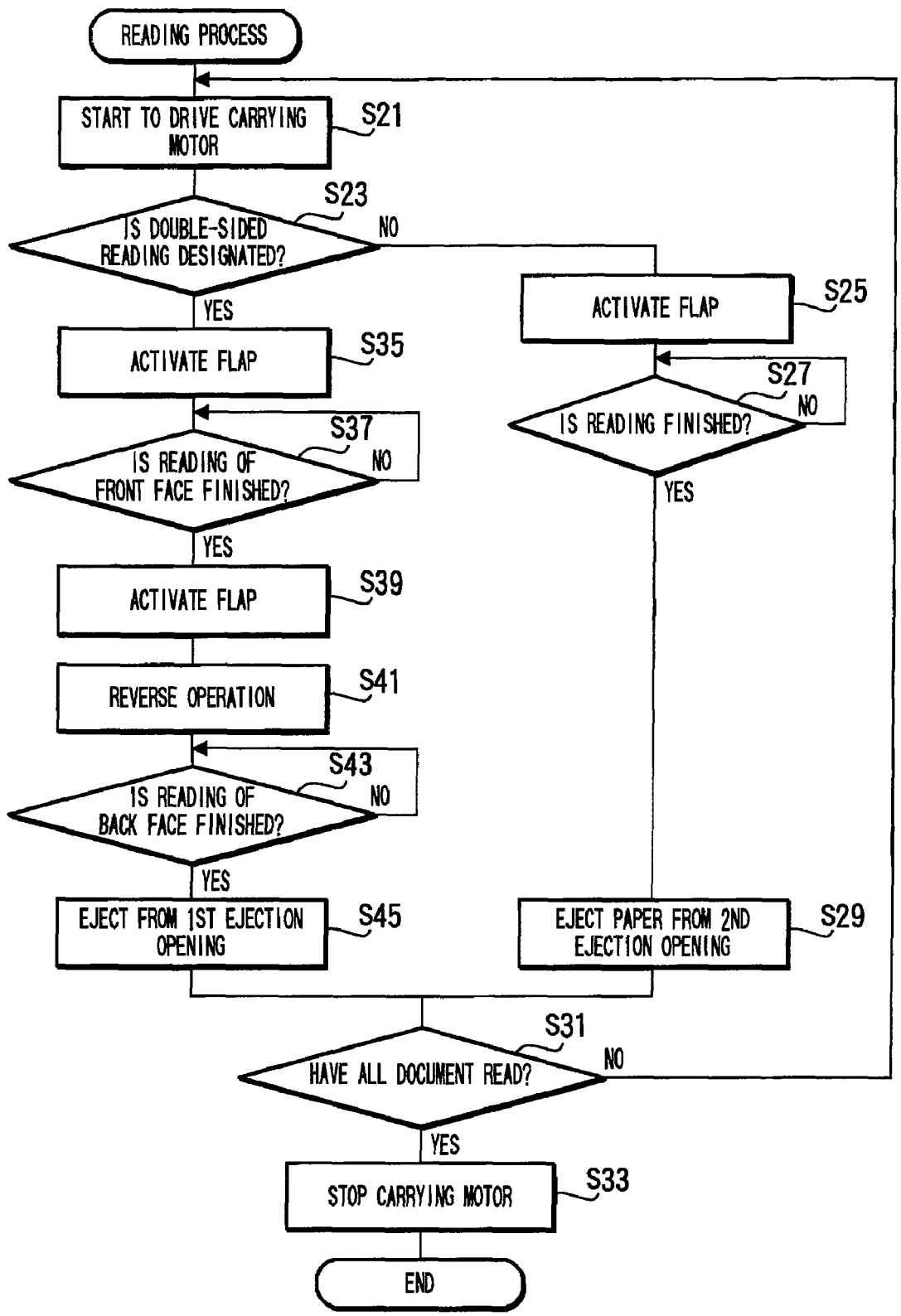
FIG. 13 is a flowchart illustrating control of the ADF according to the second embodiment.

FIG. 13 is a flowchart illustrating a carrying control process according to the second embodiment. The carrying control process is executed under control of the controller 135 when the user presses the read start button.

As shown in FIG. 13, when the carrying control process is started, the controller 135 starts to rotate the carrying motor 134 (step S21). Then, the controller 135 judges whether the double-sided reading mode is selected by the user (i.e., which of the double-side reading mode and the single-side reading mode is selected) (step S23).

When the single-side reading mode is selected (S23: NO), the first flap 132A and the second flap 132B move to the state shown in FIG. 10 (step S25). Then, the controller 135 judges whether the image reading is finished in accordance with the output signal from the second sensor 128B (step S27).

If it is judged that the image reading is finished (S27:YES), the sheet of paper for which the image reading is finished is ejected through the second ejection opening 131B (step S29). The controller 135 waits until the image reading is finished (step S27: NO).

Next, the controller 135 judges whether all the sheets of paper (document) placed on the document tray 131 have read (step S31). When all the sheets of paper have read (S31:YES), the controller 135 stop the carrying motor 134. Then, the carrying control process is terminated. When all of the sheets of paper have not been read (S31: NO), control returns to step S21.

If it is judged that the double-sided reading mode is selected in step S3 (S23: YES), the second flap 132B are driven to move to the sate shown in FIG. 11 (step S35). Then, the controller 135 judges whether the reading for the front-face is finished in accordance with the output signal from the second sensor 128B (step S37).

If it is judged in step S37 that the image reading for the front-face is finished (S37: YES) the first flap 132A and the second flap 132B are driven to move to the state shown in FIG. 12 (step S39. Then, the controller 135 starts to control the reversing mechanism 127 (step S41).

Next, the controller 135 judges whether the image reading for the back-face is finished in accordance with the output signal from the second sensor 128B (step S43). If it is judged that the image reading for the back-face is finished (S43: YES), the sheet of paper is ejected through the first ejection opening 130B (step S45). Then, the controller 135 judges whether all of the sheets of paper of the document placed on the document tray 121 have been read (step S31).

The controller 135 waits until the image reading for the back-face is not finished (S43: NO).

Hereafter, advantages of the second embodiment are described.

Considering the case where two sheets of paper (hereafter, referred to as document A and document B) are placed on the document tray 121, the front-face of the document A is defined as page 1, the back-face of the document A is defined as page 2, the front-face of the document B is defined as page 3, and the back-face of the document B is defined as page 4, and the documents A and B are stacked on the document tray 121 such that each front-face faces upward, in this case by executing the image reading in the double-sided reading mode, the documents A and B for which the image reading is finished are ejected to the output tray 123 through the first ejection opening 131A.

Therefore, in the double-sided reading mode, the sheets of paper for which the image reading is finished are stacked from the bottom to the top such that each front-face faces upward. In other words, in the double-sided reading mode, the pages 1 to 4 are arranged in this order from the bottom to the top on the output tray 123. Therefore, the page sequence of the documents placed on the document tray 121 is equal to the page sequence of the documents on the output tray 123.

On the other hand, in the case of the single-side reading mode, the document for which the image reading is finished is ejected to the output tray 123 through the second ejection opening 131B and the documents A and B are stacked on the output tray 123 from the bottom to the top such that each front-face faces downward. Therefore, in the single-side reading mode, the page sequence of the documents placed on the document tray 121 is equal to the page sequence of the documents placed on the output tray 123.

Therefore, according to the second embodiment, it is prevented that the page sequence of a plurality of sheets of paper (documents) on the document tray 121 becomes different from the page sequence of the plurality of sheets of paper on the output tray 123. Further, in the second embodiment, only one output tray is provided. Therefore, the ADF 120X according to the second embodiment is able to eliminate the need for checking which of output trays is used for ejecting the sheets of paper. Therefore, usability of the image reading device 100 capable of performing the double-sided reading and the single-side reading can be enhanced.

Although the present invention has been described in considerable detail with reference to certain preferred embodiments thereof, other embodiments are possible.

In the first embodiment, the sheets of paper placed on the document tray 121 are fed one by one to the automatic read window 103 from the sheet of paper at the bottom of the stacked sheets. However, the sheets of paper placed on the document tray 121 may be fed one by one to the automatic read window 103 from the sheet of paper at the top of the stacked sheets. Further, the sheet of paper may be ejected from the second ejection opening 131B in the single-side reading mode, and the sheet of paper may be ejected from the first ejection opening 130B in the double-sided reading mode.

In the second embodiment, the sheets of paper placed on the document tray 121 are fed one by one to the automatic read window 103 from the sheet of paper at the top of the stacked sheets. However, the sheets of paper placed on the document tray 121 may be fed one by one to the automatic read window 103 from the sheet of paper at the bottom of the stacked sheets. Further, the sheet of paper may be ejected from the first ejection opening 130B in the single-side reading mode, and the sheet of paper may be ejected from the second ejection opening 131B in the double-sided reading mode.

In the above described embodiments, the carrying path is turned to make a U-turn in the mechanism body portion 120A. However, the ADF may be configured such that the document tray 121 is positioned at one side of the mechanism body portion 120A and the output tray 123 is placed at the other side of the mechanism body portion 120A.

In the above described embodiment, the second ejection opening 131B is positioned on the upper side of the first ejection opening 130B, and the first ejection opening 130B is positioned closer to the output tray 123 in comparison with the second ejection opening 131B. However, the structure for the first and second ejection openings 130B and 131B is not limited to that shown in the above described embodiments.

What is claimed is:

1. An automatic document feeder, comprising:
a document tray configured to support a document to be read;
an output tray configured to receive the document after having been read;
a first rotating body configured to contact the document and rotate to eject the document for which the image reading is finished by passing a reading portion, to the output tray via a first opening to eject the document on top of other documents;
a second rotating body configured to contact the document and rotate to eject the document for which the image reading is finished by passing the reading portion, to the output tray via a second opening to eject the document underneath the other documents;
a reversing mechanism configured to reverse a carrying direction of the document which passed the reading portion to carry again the document to the reading portion;
a sinking mechanism configured to sink the document ejected from the first rotating body into a position between a bottom of a document already stacked on the output tray and a surface of the output tray; and
a switching mechanism configured to switch between a first path of carrying the document to the first rotating body and a second path of carrying the document to the second rotating body, in accordance with whether the reversing mechanism is activated.

2. The automatic document feeder according to claim 1, wherein the first rotating body is located on a lower side of the second rotating body to be closer to the output tray in comparison with the second rotating body.

3. The automatic document feeder according to claim 2, wherein:
the output tray is positioned, in a horizontal direction, on a side with respect to a mechanism body portion which is defined in the automatic document feeder as being provided in a portion corresponding to the reading portion; and
the second rotating body is located to be closer to the mechanism body portion in the horizontal direction in comparison with the first rotating body.

4. The automatic document feeder according to claim 1, further comprising a feeder mechanism configured to feed a plurality of documents stacked vertically on the document tray to the reading portion one by one from a bottom of the plurality of documents,
wherein:
the document tray is located on a lower side of the output tray;
the switching mechanism carries the document for which the image reading is finished to the second rotating body to eject the document to the output tray through the second rotating body when the reversing mechanism is activated; and
the switching mechanism carries the document for which the image reading is finished to the first rotating body to eject the document to the output tray through the first rotating body when the reversing mechanism is not activated.

5. The automatic document feeder according to claim 1, further comprising a feeder mechanism configured to feed a plurality of documents stacked vertically on the document tray to the reading portion one by one from a bottom of the plurality of documents,
wherein:
the document tray is located on an upper side of the output tray;
the switching mechanism carries the document for which the image reading is finished to the first rotating body to eject the document to the output tray through the first rotating body when the reversing mechanism is activated; and
the switching mechanism carries the document for which the image reading is finished to the second rotating body to eject the document to the output tray through the second rotating body when the reversing mechanism is not activated.

6. The automatic document feeder according to claim 1, wherein the second rotating body is located not to eject the document toward the sinking mechanism.

7. An image reading device, comprising:
an automatic document feeder; and
a reading portion configured to read an image from a document carried by the automatic document feeder,
the automatic feeder comprising:
a document tray configured to support a document to be read;
an output tray configured to receive the document after having been read;

a first rotating body configured to contact the document and rotate to eject the document for which the image reading is finished by passing a reading portion, to the output tray via a first opening to eject the document on top of other documents;

a second rotating body configured to contact the document and rotate to eject the document for which the image reading is finished by passing the reading portion, to the output tray via a second opening to eject the document underneath the other documents;

a reversing mechanism configured to reverse a carrying direction of the document which passed the reading portion to carry again the document to the reading portion;

a sinking mechanism configured to sink the document ejected from the first rotating body into a position between a bottom of a document already stacked on the output tray and a surface of the output tray; and a switching mechanism configured to switch between a first path of carrying the document to the first rotating body and a second path of carrying the document to the second rotating body, in accordance with whether the reversing mechanism is activated.

8. The image reading device according to claim 7, wherein the first rotating body is located on a lower side of the second rotating body to be closer to the output tray in comparison with the second rotating body.

9. The image reading device according to claim 8, wherein:
the output tray is positioned, in a horizontal direction, on a side with respect to a mechanism body portion which is defined in the automatic document feeder as being provided in a portion corresponding to the reading portion; and the second rotating body is located to be closer to the mechanism body portion in the horizontal direction in comparison with the first rotating body.

10. The image reading device according to claim 7, further comprising a feeder mechanism configured to feed a plurality of documents stacked vertically on the document tray to the reading portion one by one from a bottom of the plurality of documents, wherein:
the document tray is located on a lower side of the output tray;

the switching mechanism carries the document for which the image reading is finished to the second rotating body to eject the document to the output tray through the second rotating body when the reversing mechanism is activated; and the switching mechanism carries the document for which the image reading is finished to the first rotating body to eject the document to the output tray through the first rotating body when the reversing mechanism is not activated.

11. The image reading device according to claim 7, further comprising a feeder mechanism configured to feed a plurality of documents stacked vertically on the document tray to the reading portion one by one from a bottom of the plurality of documents, wherein:
the document tray is located on an upper side of the output tray;

the switching mechanism carries the document for which the image reading is finished to the first rotating body to eject the document to the output tray through the first rotating body when the reversing mechanism is activated; and the switching mechanism carries the document for which the image reading is finished to the second rotating body to eject the document to the output tray through the second rotating body when the reversing mechanism is not activated.

12. The image reading device according to claim 7, wherein the second rotating body is located not to eject the document toward the sinking mechanism.

* * * * *